United States Patent [19]

Hefner, Jr.

[11] Patent Number: 4,786,693

[45] Date of Patent: Nov. 22, 1988

[54] VINYL ESTER RESINS PREPARED FROM URETHANE MODIFIED EPOXY RESIN COMPOSITIONS CONTAINING OXAZOLIDINONE OR THIAZOLIDINONE GROUPS

[75] Inventor: Robert E. Hefner, Jr., Lake Jackson, Tex.

[73] Assignee: The Dow Chemical Company, Midland, Mich.

[21] Appl. No.: 121,030

[22] Filed: Nov. 16, 1987

Related U.S. Application Data

[62] Division of Ser. No. 789,899, Oct. 18, 1985, Pat. No. 4,742,146.

[51] Int. Cl.[4] .............................................. C08F 26/02
[52] U.S. Cl. ..................... 525/454; 525/455; 525/528; 528/73; 528/79; 528/301; 528/302; 528/288
[58] Field of Search ................ 525/454, 455, 528; 528/73, 79, 301, 302, 288

[56] References Cited

U.S. PATENT DOCUMENTS

| | | | |
|---|---|---|---|
| 3,525,779 | 8/1970 | Hawkins | 525/528 |
| 3,634,327 | 1/1972 | Hawkins | 528/49 |
| 3,636,133 | 1/1972 | Hawkins | 525/528 |
| 3,676,397 | 7/1972 | Clarke | 528/96 |
| 3,687,897 | 8/1972 | Clarke | 528/51 |
| 3,767,624 | 10/1973 | Clarke | 525/504 |
| 3,789,053 | 1/1974 | Clarke | 528/96 |
| 3,876,618 | 4/1975 | Clarke | 528/73 |
| 4,486,582 | 12/1984 | Hefner, Jr. | 526/301 |
| 4,742,146 | 5/1988 | Hefner, Jr. | 528/73 |

*Primary Examiner*—Maurice J. Welsh
*Assistant Examiner*—M. L. Moore

[57] ABSTRACT

Urethane oligomer modified epoxy resin compositions are prepared by copolymerization of (A) an epoxy resin and (B) a urethane oligomer containing at least one oxyalkylene group and both polymerizable ethylenic unsaturation and isocyanate (isothiocyanate) groups in the presence of a suitable amount of a suitable catalyst for oxazolidinone (thiazolidinone) formation.

These modified epoxy resin compositions can be cured with conventional epoxy curing agents and they can be used to prepare vinyl ester resins.

20 Claims, No Drawings

VINYL ESTER RESINS PREPARED FROM URETHANE MODIFIED EPOXY RESIN COMPOSITIONS CONTAINING OXAZOLIDINONE OR THIAZOLIDINONE GROUPS

CROSS-REFERENCE TO RELATED APPLICATION

This is a divisional of application Ser. No. 789,899, filed Oct. 18, 1985, now U.S. Pat. No. 4,742,146.

BACKGROUND OF THE INVENTION

The present invention pertains to urethane oligomer modified epoxy resin compositions and cured products therefrom.

R. E. Hefner, Jr. and V. B. Messick disclose in copending U.S. patent application Ser. No. 734,516, now U.S. Pat. No. 4,618,658 filed May 16, 1985 polymer modified epoxy resin compositions and vinyl ester resin compositions wherein said epoxy resin compositions are prepared by (A) reacting a portion of the epoxy groups of an epoxy resin with a compound containing a group reactive with an epoxide group and a polymerizable ethylenically unsaturated group; (B) copolymerizing the resultant product with at least one vinyl terminated urethane oligomer optionally with at least one polymerizable ethylenically unsaturated monomer. These polymer modified vinyl ester resins are produced by reaction of the aforesaid polymer modified epoxy resin and a monounsaturated monocarboxylic acid.

J. A. Clarke in U.S. Pat. Nos. 3,676,397 issued July 11, 1972, 3,687,897 issued Aug. 29, 1972, 3,767,624 issued Oct. 23, 1973, 3,789,053 issued Jan. 29, 1974 and 3,876,618 issued Apr. 8, 1975 disclose the preparation of oxazolidinone modified epoxy resins. These modified epoxy resin compositions are prepared by reacting an epoxy resin with a polyisocyanate in the presence of a suitable catalyst for oxazolidinone formation.

The present invention provides novel urethane oligomer modified epoxy resin compositions produced by reacting an epoxy resin and a urethane oligomer containing at least one oxyalkylene group and both polymerizable ethylenic unsaturation and isocyanate (isothiocyanate) groups in the presence of a suitable catalyst for oxazolidinone (thiazolidinone) formation.

The modified epoxy resin compositions of the present invention can be cured with conventional curing agents. They can also be employed to prepare urethane modified vinyl ester resins by reaction with polymerizable ethylenically unsaturated monocarboxylic acids or half esters of polymerizable ethylenically unsaturated dicarboxylic acids or combinations thereof.

SUMMARY OF THE INVENTION

One aspect of the present invention pertains to urethane oligomer modified epoxy resin compositions which comprise the reaction product of (1) at least one epoxy resin with
(2) at least one urethane oligomer containing at least one oxyalkylene group or thioalkylene group and both polymerizable ethylenically unsaturated and isocyanate or isothiocyanate groups in the presence of
(3) a catalyst for oxazolidinone or thiazolidinone formation; and wherein components (1) and (2) are present in quantities such that from about 0.001 to about 25, preferably from about 0.5 to about 15 percent of the epoxide groups of component (1) are converted to oxazolidinone (thiazolidinone) groups and component (3) is employed in an amount sufficient to cause reaction of component (1) with component (2) to form oxazolidinone (thiazolidinone) groups, preferably from about 0.01 to about 3, preferably from about 0.1 to about 1.5 parts of component (3) by weight based on the combined weight of components (1), (2) and (3).

Another aspect of the present invention pertains to the product resulting from polymerizing at least one polymerizable ethylenically unsaturated compound or mixture of such compounds with at least one of the aforementioned urethane oligomer modified epoxy resin compositions.

Another aspect of the present invention pertains to the product resulting from curing at least one of the aforementioned urethane oligomer modified epoxy resin compositions with a curing quantity of at least one curing agent or curing catalyst therefor.

Another aspect of the present invention pertains to vinyl ester compositions comprising (I) the reaction product of
  (A) at least one urethane oligomer modified epoxy resin composition which comprises the reaction product of
    (1) at least one epoxy resin with
    (2) at least one urethane oligomer containing at least one oxyalkylene group or thioalkylene group and both polymerizable ethylenically unsaturated and isocyanate or isothiocyanate groups in the presence of
    (3) a catalyst for oxazolidinone or thiazolidinone formation; and wherein components (1) and (2) are present in quantities such that from about 0.001 to about 25, preferably from about 0.5 to about 15 percent of the epoxide groups of component (1) are converted to oxazolidinone (thiazolidinone) groups and component (3) is employed in an amount sufficient to cause reaction of component (1) with component (2) to form oxazolidinone (thiazolidinone) groups, preferably from about 0.01 to about 3, preferably from about 0.1 to about 1.5 parts by weight based on the combined weight of components (1), (2) and (3);
  (B) at least one member selected from
    (1) at least one polymerizable ethylenically unsaturated monocarboxylic acid,
    (2) at least one polymerizable ethylenically unsaturated half-ester of a dicarboxylic acid, or
    (3) mixtures of (1) and (2).

Another aspect of the present invention pertains to vinyl ester compositions resulting from reacting the copolymerization product of at east one polymerizable ethylenically unsaturated compound or mixture of such compounds and at least one of the aforementioned urethane oligomer modified epoxy resin compositions with at least one polymerizable ethylenically unsaturated monocarboxylic acid and/or at least one polymerizable ethylenically unsaturated half-ester of a dicarboxylic acid.

Another aspect of the present invention pertains to vinyl ester resin compositions resulting from blending (A) at least one of the aforementioned vinyl esters with (B) at least one polymerizable ethylenically unsaturated monomer; and wherein said polymerizable ethylenically unsaturated monomer is present in an amount of from 1 to about 99, preferably from about 20 to about 80, most preferably from about 30 to about 70 percent by weight of the combined weight of components (A) and (B).

Another aspect of the present invention pertains to the product resulting from curing the aforementioned vinyl ester resin with a curing quantity of at least one curing agent and/or curing catalyst therefor.

DETAILED DESCRIPTION OF THE INVENTION

Suitable epoxy resins useful in the preparation of the urethane oligomer modified epoxy resin compositions are represented by formulas and the like; A' is a divalent hydrocarbon group having from 1 to about 3, preferably 1, carbon atoms or a

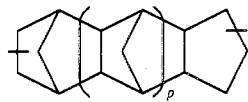

group; p has a value from zero to about 10, preferably from zero to 3; each R' is independently hydrogen, a hydrocarbyl or hydrocarbyloxy group having from 1 to about 18 carbon atoms or a halogen, preferably chlorine or bromine; R is independently hydrogen or a hydrocarbyl group having from 1 to about 3 carbon atoms; n has a value from zero or 1; n' has a value from zero to about 40, preferably from 0.1 to about 5; and m has a

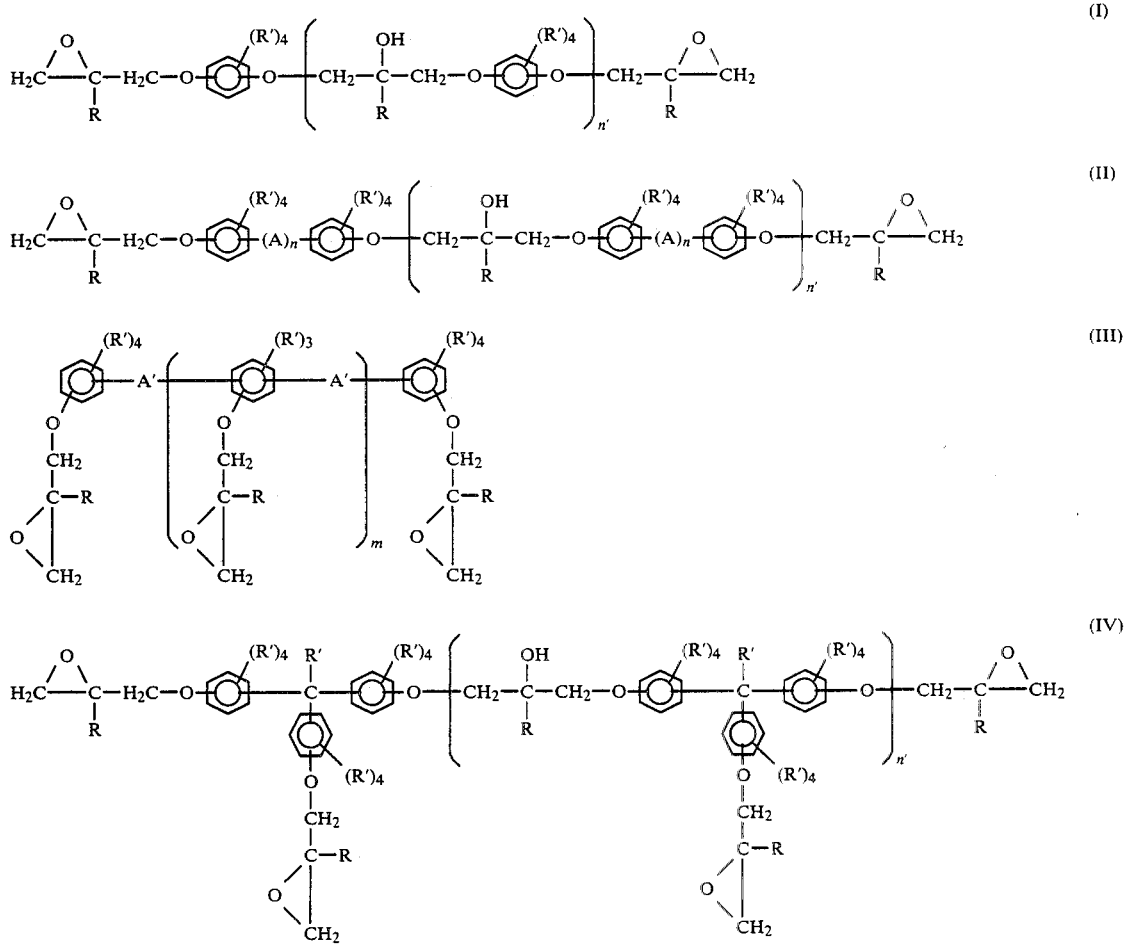

wherein A is a divalent hydrocarbon group having from 1 to about 12, preferably from 1 to about 6 carbon atoms,

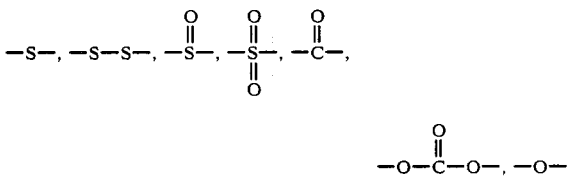

value from about 0.001 to about 6.

Suitable urethane oligomers containing at least one oxyalkylene group and both polymerizable ethylenic unsaturation and isocyanate (isothiacyanate) groups are produced by reaction of at least one polyisocyanate (polyisothiocyanate), at least one polyol containing at least one oxyalkylene group and at least one compound possessing a group reactive with the isocyanate (isothiocyanate) group and a polymerizable ethylenically unsaturated group and wherein at east about 5 mole percent but no more than 95 mole percent of the isocyanate (isothiocyanate) groups remain unreacted.

Suitable polyisocyanates include aromatic, alkyl aromatic, aiphatic, cycloaliphatic and polycycloaliphatic polyisocyanates which have an average of more than one —N=C=O group per molecule. Representative polyisocyanates include, for example, 2,4-toluenediisocyanate, 2,6-toluenediisocyanate, 4,4'-methylenediphenyldiisocyanate, hexamethylenediisocyanate, methylenebis(cyclohexylmethylisocyanate), trimethylhexamethylene diisocyanate, polymethylenepolyphenylisocyanate, cyclic trimers, cocyclic trimers, mixtures thereof and the like.

Suitable polyols containing at least one oxyalkylene group include the reaction product of most any polyol with one or more moles of an alkylene oxide, such as ethylene oxide, propylene oxide, butylene oxide, isobutylene oxide, mixtures thereof and the like. Since the isocyanate group will react with —NH as well as with —OH (or —SH) groups, the —OH groups of the polyol may be totally or partially substituted for by amino and/or sulfhydryl groups. Representative polyols containing at least one oxyalkylene group include, for example, diethylene glycol, dipropylene glycol, triethylene glycol, tripropylene glycol, polyethylene glycol, polypropylene glycol, glycerin monopropoxylate, glycerin dipropoxylate, glycerin polypropoxylates, alkanolamine polypropoxylates, sorbitol polypropoxylates, butanediol diethoxylate, pentaerythritol polypropoxylates, trimethylolpropane polypropoxylates, mixtures thereof and the like.

Suitable compounds possessing a group reactive with the isocyanate group and a polymerizable ethylenically unsaturated group include, for example, the alkenylphenols such as p-isopropenylphenol, m-vinylphenol, 4-isopropenyl-2-methylphenol, p-allylphenol, o-allylphenol; the allyl alcohols such as allyl alcohol, methallyl alcohol, allyl alcohol polypropoxylates; the hydroxyalkyl acrylates such as 2-hydroxyethylacrylate, 2-hydroxypropyl acrylate, 2-hydroxyethylmethacrylate, 2-hydroxyethylacrylate polypropoxylates; the aminoalkylacrylates such as t-butylaminoethyl methacrylate; and the acrylamides such as acrylamide, N-methylol acrylamide, methacrylamide, mixtures thereof and the like.

Also suitable urethane oligomers containing at least one oxyalkylene group and both polymerizable ethylenic unsaturation and isocyanate (isothiocyanate) groups are produced by reaction of at least one polyisocyanate (polyisothiocyanate), at least one polyol containing at least one oxyalkylene group and at least one compound containing both polymerizable ethylenic unsaturation and isocyanate (isothiocyanate) groups wherein at least about 5 mole percent but no more than 95 mole percent of the isocyanate (isothiocyanate) groups remain unreacted.

Suitable compounds possessing both polymerizable ethylenic unsaturation and isocyanate groups include, for example, vinyl isocyanate and isopropenyl isocyanate as taught by Example 8 of U.S. Pat. No. 3,598,866. Similarly, isocyanatoethylmethacrylate, allyl isocyanate and allyl isothiocyanate may also be used.

A most preferred urethane oligomer containing at least one oxyalkylene group and both polymerizable ethylenic unsaturation and isocyanate groups is prepared from about 0.5 molecular proportion of an about 2000 molecular weight polypropylene glycol, about one molecular proportion of a monomeric diisocyanate and about 0.5 molecular proportion of a hydroxyalkylacrylate or methacrylate, in either of two reaction sequences. In one reaction sequence, the glycol and diisocyanate are reacted with each other before the hydroxyalkylacrylate (methacrylate) is added. Alternately, the hydroxyalkylacrylate (methacrylate) and diisocyanate are first reacted with each other then the glycol is added. This latter reaction sequence is used to produce a urethane oligomer of lower average molecular weight.

In a typical example, 1 mole of toluene diisocyanate and 0.5 mole of a 2000 molecular weight polypropylene glycol are reacted together then the resulting product is reacted with 0.5 mole of 2-hydroxyethylacrylate.

It is also operable to simultaneously react the diisocyanate, glycol and hydroxyalkylacrylate (methacrylate) components. In any case, the reactant ratio must be controlled to insure the presence of the requisite unconverted isocyanate end-groups in the product.

A suitable catalyst is optionally, although preferably, employed to facilitate reaction of the diisocyanate, glycol and hydroxyalkylacrylate (methacrylate) components. Said catalysts are well known in polyurethane chemistry and include, for example, metal salts of carboxylic acids such as stannous octoate, lead octoate, dibutyl tin laureate and hindered tertiary amines such as diazabicycloundecane, triethylenediamine, mixtures thereof and the like. Said catalysts are typically used in amounts of from about 0.1 to about 2 percent by weight of the total reactants used. If desired, it is possible to incorporate a polymerization inhibitor into the reaction mixture in order to reduce the possiblity of premature vinyl polymerization of the ethylenically unsaturated groups of the hydroxyalkyl acrylate (methacrylate) and/or urethane oligomer product. Examples of such inhibitors include hydroquinone an 2,6-di-tertiarybutyl-4-methylphenol.

A suitable catalyst for oxazolidinone (thiazolidinone) formation is used in the reaction of at least one urethane oligomer containing at least one oxyalkylene group and both polymerizable ethylenic unsaturation and isocyanate (isothiocyanate) groups and at least one epoxy resin represented by formulas I, II, III, IV. Said catalysts include trialkylamines, alkali metal halides and quaternary ammonium and phosphonium compounds. A most preferred catalyst is tetrabutylphosphonium bromide.

In addition to forming oxazolidinone (thiazolidinone) structures, a portion of the isocyanate (isothiocyanate) groups of the urethane oligomer containing at least one oxyalkylene group and both polymerizable ethylenic unsaturation and isocyanate (isothiocyanate) groups can react with the secondary hydroxy groups of epoxy resins represented by formulas I, II, IV, wherein n' has a value greater than zero, to provide urethane structures.

Suitable polymerizable ethylenically unsaturated compounds for copolymerization with the urethane oligomer modified epoxy resin containing at least one oxyalkylene group and both oxazolidinone groups and polymerizable ethylenic unsaturation include, for example, vinyl aromatic monomers such as, for example, styrene, vinyl toluenes, t-butylstyrenes, divinylbenzenes, chlorostyrenes, vinyl naphthalene, α-methylstyrene and, for example, acrylate monomers such as, for example n-butyl acrylate, sec-butyl acrylate, dicyclopentadienyl acrylate, 2-ethylhexyl acrylate, 2-ethylhexyl methacrylate, ethyl acrylate, cyclohexyl acrylate, mixtures thereof and the like. Thus, suitable polymerizable ethylenically unsaturated compounds generally are those commonly copolymerized with monomers having terminal or pendant, vinyl-reactive, olefinic or cycloolefinic double bonds. Such monomers are well catalogued in the prior art. A suitable catalyst is optionally, although preferably, employed to facilitate copolymerization of the urethane oligomer modified epoxy resin containing at least one oxyalkylene group and both oxazolidinone (thiazolidinone) groups and polymerizable ethylenic unsaturation and at least one polymerizable ethylenically unsaturated compound. Said catalysts are the well known free radical-forming catalysts and include, for example, the organic peroxides and hydroperoxides, such as benzoyl peroxide, di-tert-butyl peroxide, t-butylperoxybenzoate, t-butylhydroperoxide, methylethylketone peroxide, and the azo and diazo compounds, such as azobisisobutyronitrile. It is also operable to use mixtures of said free radical-forming catalysts. Said catalysts are typically used in amounts of from about 0.1 to about 5 percent by weight.

Reaction temperatures of from about 20° C. to about 250° C. are used for the copolymerization, with temperatures of from about 25° C. to 125° C. being preferred.

Reaction times of from about 5 minutes (300 s) to about 8 hours (28,800 s) are used for the copolymerization, with times of from about 15 minutes (900 s) to about 4 hours (14,400 s) being preferred.

The copolymerization can also be carried out with an inert solvent present, although this is not generally preferred. Most any solvent can be used, provided it does not interfere with the copolymerization. Representative solvents include xylene, toluene, methylchloroform, methylene chloride and the like. Any solvent, if used, is preferably removed before the product is converted to a vinyl ester, if this reaction is to be performed.

The copolymerization can also be carried out in the presence of from about 0.01 to about 2 percent by weight of a chain transfer agent, although this is generally not preferred. Representative chain transfer agents include the alkyl mercaptans, such as butyl mercaptan, stearyl mercaptan; the disulfides and halogenated compounds, especially those containing bromine.

In a preferred process of the present invention, a urethane oligomer modified epoxy resin containing at least one, preferably about two or more oxyalkylene group(s) and both oxazolidinone (thiazolidinone) groups and polymerizable ethylenic unsaturation is produced by reaction of about 0.001 to about 5 mole percent, preferably 0.5 to 3 mole percent of the epoxy groups of the epoxy resin precursor. The aforesaid urethane oligomer modified epoxy resin is then copolymerized with at least one polymerizable ethylenically unsaturated compound in the presence of a free radical-forming catalyst. The resulting product is a polymer modified epoxy resin containing chemically bonded copolymer units derived from reaction of the polymerizable ethylenic unsaturation of the urethane oligomer modified epoxy resin and the polymerizable ethylenically unsaturated compound(s). Said product also may contain (non-chemically bonded) homopolymer of the polymerizable ethylenically unsaturated compound. The resulting polymer modified epoxy resin may then be cured using a suitable curing agent. Suitable curing agents for curing epoxy resins are described in the *Handbook of Epoxy Resins* by Lee and Neville, McGraw-Hill, (1967) as well as U.S. Pat. Nos. 3,477,990; 3,948,855; and 4,366,295 which are incorporated herein by reference.

The urethane oligomer modified epoxy resin containing at least one oxyalkylene group and both oxazolidione (thiazolidone) groups and polymerizable ethylenic unsaturation or the copolymer of the aforesaid urethane modified epoxy resin and at least one polymerizable ethylenically unsaturated compound are also well suited for advancement reaction with a polyphenol, such as bisphenol A, to provide the corresponding urethane oligomer modified advanced epoxy resin. Advancement reaction of epoxy resins is well known in the art and is described in the aforementioned *Handbook of Epoxy Resins*.

The urethane oligomer modified vinyl ester compositions are prepared by reacting (A) at least one urethane modified epoxy resin containing at least one oxyalkylene group and both oxazolidinone or thiazolidinone groups and polymerizable ethylenic unsaturation or (B) at least one copolymerization product of a urethane modified epoxy resin containing at least one oxyalkylene group and both oxazolidinone or thiazolidinone groups and polymerizable ethylenic unsaturation and at least one polymerizable ethylenically unsaturated compound or (C) a mixture of (A) and (B) with (D) at least one polymerizable ethylenically unsaturated monocarboxylic acid and/or at least one polymerizable ethylenically unsaturated half-ester of a dicarboxylic acid. The reaction is preferably conducted in the presence of a suitable quantity of a suitable catalyst.

Suitable monounsaturated monocarboxylic acids for reaction with the urethane oligomer modified epoxy resins include acrylic acid, methacrylic acid, cyanoacrylic acid, crotonic acid, α-phenylacrylic acid, methoxyacrylic acid, the monomethyl ester of fumaric acid, cinnamic acid and the like or mixtures thereof. Methacrylic acid is a most preferred monounsaturated monocarboxylic acid. The reaction between the urethane oligomer modified polyepoxide or the copolymer of the urethane oligomer modified polyepoxide and a polymerizable ethylenically unsaturated compound and a monounsaturated monocarboxylic acid is typically performed in the presence of a catalyst. Suitable catalysts for use herein are well known in the prior art. Chromium trichloride, tris(dimethylaminoethyl)phenol, and ethyltriphenylphosphonium acetate.acetic acid complex are most preferred as the catalysts. A quantity of from about 0.01 to about 2 percent by weight has been found to be a particularly suitable quantity of catalyst with concentrations of 0.1 to about 0.3 weight percent of the total reactants used being most preferred.

A suitable process inhibitor is typically used in the reaction between the urethan oligomer modified epoxy resin or the copolymer of the urethane oligomer modified epoxy resin and a polymerizable ethylenically unsaturated compound and a monounsaturated monocarboxylic acid to prevent gelation (homopolymerization of the vinyl ester and/or copolymerization of the vinyl ester with unreacted monounsaturated monocarboxylic acid). Suitable inhibitors for use herein are well known in the prior art. Hydroquinone activated with air is a most preferred inhibitor at concentrations of from about 100 ppm to about 500 ppm based on the weight of the urethane oligomer modified epoxy resin or the copolymer of the urethane oligomer modified epoxy resin and a polymerizable ethylenically unsaturated compound and monounsaturated monocarboxylic acid used.

The reaction to produce the urethane oligomer modified vinyl ester is usually conducted at a temperature of from about 50° C. to about 125° C., preferably from about 80° C. to about 120° C. for from about 60 minutes (3600 s) to about 720 minutes (43,200 s), preferably from about 120 minutes (7200 s) to about 480 minutes (28,800 s). Although reaction times and reaction temperatures can vary substantially, most preferred vinyl ester compositions are obtained by reacting to a specific conversion, typically 1.5 to 0.25 percent carboxylic acid.

In a preferred process of the present invention, a urethane oligomer modified epoxy resin containing at least one, preferably one to about four oxyalkylene group(s) and both oxazolidinone (thiazolidinone) groups and polymerizable ethylenic unsaturation is produced by reaction of about 5 mole percent to about 25 mole percent, preferably 7.5 to about 15 mole percent of the epoxy groups of the epoxy resin precursor. The aforesaid urethane oligomer modified epoxy resin is then reacted with methacrylic acid in the presence of a suitable catalyst as previously described to provide the vinyl ester. The resulting product is a urethane oligomer modified vinyl ester containing oxazolidinone (thiazolidinone) groups and

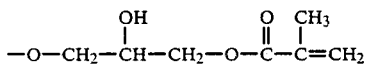

groups.

The urethane oligomer modified vinyl ester is typically combined with one or more reactive diluents, such as polymerizable ethylenically unsaturated compounds. Representative species of said compounds suitable for this use include those previously described herein. Most preferred as the reactive diluent is styrene.

The blended urethane oligomer modified vinyl ester resin may consist of up to 99 percent by weight of polymerizable ethylenically unsaturated compound with the balance of the combined weight consisting of said urethane oligomer modified vinyl ester. Most preferably, the resin composition consists of about 30 to about 70 percent by weight of said polymerizable ethylenically unsaturated compound and about 70 to about 30 percent by weight of said vinyl ester.

While it is preferred in many applications to blend the urethane oligomer modified vinyl ester resin with a polymerizable ethylenically unsaturated compound, the present invention is not limited thereto. The urethane oligomer modified vinyl ester can be cured (homopolymerized) in the absence of a polymerizable ethylenically unsaturated compound and can be applied and utilized as solutions in a nonpolymerizable solvent, such as is practiced in certain coating operations.

According to the present invention, the curing of the urethane oligomer modified vinyl ester resin compositions is effected by the application of heat and/or pressure, preferably in the presence of one of the aforementioned free radical-forming catalysts. Additionally, curing may be carried out in the presence of about 0.01 to about 2 percent by weight of an accelerating agent, such as cobalt naphthenate, N,N-dimethylaniline, and the like.

Additional compositions of the present invention also include blends of the urethane oligomer modified vinyl ester resins and the vinyl ester resins of the prior art, as well as the cured compositions from said blends. Representative of said prior art vinyl ester resins include those disclosed in U.S. Pat. Nos. 3,367,992; 3,066,112; 3,179,623; 3,301,743 and 3,256,226 which are incorporated herein by reference.

Both the urethane oligomer modified epoxy resins and the urethane oligomer modified vinyl ester resins of the present invention are useful to make laminates, castings, coatings, encapsulations, and the like. The laminates are made by curing the aforesaid epoxy resin or vinyl ester resin to which a suitable fibrous reinforcement such as asbestos fibers, carbon fibers, fibrous glass, aramid fibers or inorganic fibers has been added. The fibers may be in the form of mats, strands, sheets, filaments, yarns, chopped strands, ribbons, and the like. The aforesaid epoxy resin or vinyl ester resin formulation can be rolled, sprayed or impregnated into the fibrous reinforcement.

The urethane oligomer modified epoxy resins or vinyl ester resins may be compounded with solvents, pigments, fire suppressants, low profile additives, fillers or other resinous products and cured to form useful coatings in a manner well known in the art.

The compositions of the present invention have properties that make them well adapted for molding, pultrusion, filament winding, injection molding and other known fabrication procedures. A preferred use is in fabricated parts where improved toughness is necessary yet a high degree of corrosion resistance and processability are still required. Typical of these applications are pultrusion-formed oil well sucker rods, composite aircraft parts, as well as filament wound large and small diameter pipe.

The following examples are illustrative of the invention, but are not to be construed as to limiting the scope thereof in any manner.

EXAMPLE 1

A. Preparation of a Vinyl and Isocyanate Terminated Urethane Oligomer from a Polypropylene Glycol, Toluene Diisocyanate and 2-Hydroxyethyl Acrylate Toluene diisocyanate (1.0108 moles, 176.04 grams) and phenothiazine (245 ppm, 0.3 gram) were added to a reactor and maintained with stirring at 25° C. under a nitrogen atmosphere. The toluene diisocyanate used was an 80 to 20 weight percent mixture of the 2,4- and 2,6-isomers. Polypropylene glycol having an average molecular weight of 1968.4 (1.0076 moles of hydroxyl groups, 991.7 grams) was mixed with stannous octoate catalyst (570 ppm, 0.7 gram) and a tertiary alkyl amine catalyst (570 ppm, 0.7 gram) and the mixture was added to the reactor. A maximum exotherm of 43° C. occurred 10 minutes (600 s) after the polypropylene glycol and catalyst addition. At this time, heating of the reaction mixture commenced and 8 minutes (480 s) later a reaction temperature of 65° C. was achieved. The reaction was allowed to progress for 56 minutes (3360 s) at 65° C. after which time infrared spectrophotometric analysis of a film sample of the reaction product demonstrated essentially complete reaction (disappearance of hydroxyl group absorbance). At this time, 2-hydroxyethyl acrylate (0.5038 mole, 58.5 grams) was added to the reactor. A maximum exotherm of 67° C. occurred 4 minutes (240 s) after the 2-hydroxyethyl acrylate addition. At this time, heating of the reaction mixture commenced and 4 minutes (240 s) later, a reaction temperature of 75° C. was achieved. The reaction was allowed to progress for 40 minutes (2400 s) at 75° C. after which time infrared spectrophotometric analysis of a film sample of the reaction product demonstrated essentially complete reaction (disappearance of hydroxyl group absorbance). Hydroquinone (0.06 gram) was added as an inhibitor and the product was recovered as a transparent, viscous liquid of the following statistical structure:

phenol (200 ppm, 0.25 gram) and additional styrene (416.5 grams) were added to the reactor to provide a total of 40 weight percent styrene. The vinyl ester resin

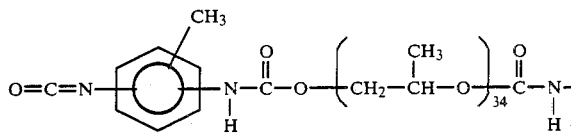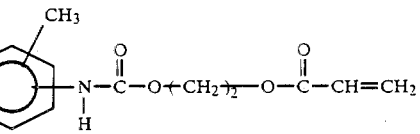

B. Preparation of a Modified Diglycidyl Ether of Bisphenol A Containing Oxazolidinone Linkages and Vinyl Unsaturation A portion (1000 grams) of a diglycidyl ether of bisphenol A having an epoxide equivalent weight (EEW) of 181.5 was added to a reactor and heated with stirring under a nitrogen atmosphere to 50° C. At this time, tetrabutylphosphonium bromide catalyst (0.00042 mole, 0.1425 gram was added to the reactor, then the reactor was heated over a 15 minute (900 s) period to 75° C. At this time, a portion (0.0551 mole, 135.3 grams) of the vinyl and isocyanate terminated urethane oligomer from A above was added to the reactor then heating to 120° C. commenced over a 17 minute (1020 s) period. The reaction was continued at the 120° C. reaction temperature for an additional 4 hours (14,400 s) then the modified epoxy resin was recovered as a light yellow colored, transparent liquid with an EEW of 207.03. A theoretical EEW of 208.64 was calculated for the modified epoxy resin wherein all isocyanate groups of the vinyl and isocyanate terminated urethane oligomer are converted to oxazolidinone groups. Infrared spectrophotometric analysis of a film sample of the modified epoxy resin demonstrated that complete conversion of isocyanate groups occurred, while a shoulder at 1760 $cm^{-1}$ was attributed to the oxazolidinone group.

C. Preparation of a Vinyl Ester Resin of the Modified Diglycidyl Ether of Bisphenol A Containing Oxazolidinone Linkages and Vinyl Unsaturation A portion (901.8 grams) of the modified diglycidyl ether of bisphenol A containing oxazolidone linkages and vinyl unsaturation from B above was added to a reactor and heated to 90° C. When the 90° C. reaction temperature was achieved, an air sparge was started 0.5 liter per minute, 8.3 ml/s) then hydroquinone (216 ppm, 0.27 gram) and glacial methacrylic acid (4.039 moles, 347.7 grams) were sequentially added. After 5 minutes (300 s), 2,4,6-tris(N,N-dimethylaminomethyl)phenol (0.108 percent by weight, 1.35 grams) was added to the reactor then the reaction temperature was increased to 105° C. After 5 minutes (300 s) at the 105° C. reaction temperature, the temperature was increased to 117° C. After 360 minutes (21,600 s) of reaction at the 117° C. temperature, titration of a sample of the vinyl ester demonstrated the presence of 0.96 percent carboxylic acid and 1.04 percent epoxide. Oxalic acid (408 ppm, 0.51 gram) and styrene (416.5 grams) were added to the reactor. When the reaction temperature reached 90° C., phenothiazine (280 ppm, 0.35 gram), 4-chloro-2-nitrowas recovered as a transparent, light yellow colored liquid.

EXAMPLE 2

A. Preparation of a Vinyl and Isocyanate Terminated Urethane Oligomer from a Tripropylene Glycol, Toluene Diisocyanate and 2-Hydroxyethyl Acrylate Toluene diisocyanate (2.5 moles, 435.4 grams) and phenothiazine (200 ppm, 0.22 gram) were added to a reactor and maintained with stirring at 23° C. under a nitrogen atmosphere. The toluene diisocyanate used was an 80 to 20 weight percent mixture of the 2,4- and 2,6-isomers. Tripropylene glycol (1.25 moles, 240.8 grams) was mixed with stannous octoate catalyst (550 ppm, 0.595 gram and a terLiary alkyl amine catalyst (550 ppm, 0.595 gram) and the mixture was added to the reactor over a 48 minute (2880 s) period and so as to obtain a maximum exotherm no greater than 65° C.

After completion of the tripropylene glycol and catalyst addition, the reaction was allowed to progress for 28 minutes (1680 s) at 59° C. after which time infrared spectrophotometric analysis of a film sample of the reaction product demonstrate essentially complete reaction (disappearance of hydroxyl group absorbance). At this time, 2-hydroxyethyl acrylate (1.25 moles, 145.2 gram) was added to the reactor over a twenty minute (1200 s) period and so as to obtain a maximum exotherm no greater than 75° C. At this time, heating of the reaction mixture commenced and five minutes (300 s) later, a reaction temperature of 80° C. was achieved. The reaction was allowed to progress for 21 minutes (1260 s) at 80° C. after which time infrared spectrophotometric anaysis of a fim sample of the reaction product demonstrated essentialy complete reaction (disappearance of hydroxyl group absorbance). Hydroquinone (0.06 gram) was added as an inhibitor and the product was recovered as a transparent, brittle solid of the following statistical structure:

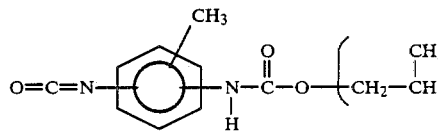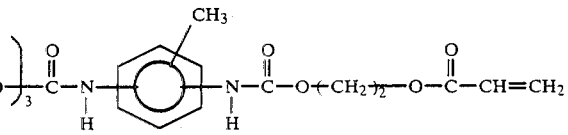

B. Preparation of a Modified Diglycidyl Ether of Bisphenol A Containing Oxazolidinone Linkages and Vinyl Unsaturation A portion (90.76 grams) of a diglycidyl ether of bisphenol A having an epoxide equivalent weight (EEW) of 181.5, a portion (41.04 grams) of the vinyl and isocyanate terminated urethane oligomer from A above and hydroquinone (600 ppm, 0.0671 gram) were added to a reactor and heated with stirring under an air sparge (0.5 liter per minute, 8.3 ml/s) to 75° C. At this time, tetrabutylphosphonium bromide catalyst (0.00042 mole, 0.1425 gram) was added to the reactor, then the reactor was heated over a seven minute (420 s) period to 110° C. The reaction was continued at the 110° C. reaction temperature for an additional 130 minutes (7800 s), then the modified epoxy resin was recovered as a light yellow colored, transparent liquid with an EEW of 293.92. A theoretical EEW of 301.12 was calculated for the modified epoxy resin wherein all isocyanate groups of the vinyl and isocyanate terminated urethane oligomer are converted to oxazolidinone groups. Infrared spectrophotometric analysis of a film sample of the modified epoxy resin demonstrated that complete conversion of isocyanate groups occurred, while absorbance at 1760 cm$^{-1}$ was attributed to the oxazolidinone group.

C. Preparation of a Vinyl Ester Resin of the Modified Diglycidyl Ether of Bisphenol A Containing Oxazolidinone Linkages and Vinyl Unsaturation A portion (131.3 grams) of the modified diglycidyl ether of bisphenol A containing oxazolidinone linkages and vinyl unsaturation from B above was added to a reactor and heated to 90° C. When the 90° C. reaction temperature was achieved, an air sparge was started (0.5 liter per minute, 8.3 ml/s) then hydroquinone (400 ppm, 0.0671 gram) and glacial methacrylic acid (0.4225 mole, 36.37 grams were sequentially added. After four minutes (240 s), 33.3% aqueous chromium trichloride (0.125 percent by weight based on epoxy resin plus methacrylic acid, 0.164 gram) was added to the reactor then the reaction temperature was increased to 110° C. After three minutes (180 s) at the 110° C. reaction temperature, the temperature was increased to 115° C. After 130 minutes (7800 s) of reaction at the 115° C. temperature, titration of a sample of the vinyl ester demonstrated the presence of 0.96 percent carboxylic acid and 1.14 percent epoxide. The reactor was cooled to 80° C., then phenothiazine (200 ppm, 0.0332 gram) was added followed by addition of styrene 93.38 grams) to provide a total of 36 weight percent styrene. The vinyl ester resin was recovered as a transparent light yellow colored liquid.

EXAMPLE 3

Portions of the vinyl ester resin of Example 1-C and Example 2-C were used for kinematic viscosity (25° C.) and SPI gel test (84° C.) determinations. Clear, unfilled ⅛ inch (0.3175 cm) castings were prepared for heat distortion temperature (264 psi, 1820 kPa), tensile and flexural strength, flexural modulus, percent elongation and average Barcol hardness (934-1 scale) determinations.

Each casting was cured at room temperature (25° C.) using a cure system of 1.22 percent by weight methylethylketone peroxide and 0.3 percent by weight cobalt naphthenate (6 percent). Twenty-four hours (86,400 s) after the cure exotherm had subsided, post curing for 2 hours (7200 s) at 100° C. was completed. Mechanical properties of tensile (8) and flexural (6) test pieces were determined using an Instron machine with standard methods (ASTM D-638 and D-790). Heat distortion temperature of clear casting test pieces (2) was determined using an Aminco Plastic Deflection Tester (American Instrument Co.) with standard test methods (ASTM D-648 modified by use of ⅛ inch thick test pieces). The results are given in Table I.

TABLE I

|  | Example 1-C | Example 2-C |
| --- | --- | --- |
| Barcol Hardness | 45 | 48 |
| Tensile Strength, |  |  |
| psi | 11,604 | 12,308 |
| kPa | 80,007 | 84,862 |
| Elongation, % | 4.18 | 3.39 |
| Flexural Strength, |  |  |
| psi | 21,502 | 23,698 |
| kPa | 148,252 | 163,393 |
| Flexural Modulus, |  |  |
| psi | 534,396 | 568,400 |
| kPa | 3,684,554 | 3,919,004 |
| Heat Distortion Temperature, |  |  |
| °F. | 212.5 | 219 |
| °C. | 100 | 104 |

EXAMPLE 4

A. Copolymerization of a Modified Diglycidyl Ether of Bisphenol A Containing Oxazolidinone Linkages and Vinyl Unsaturation with 2-Ethylhexyl Acrylate The method of Example 1-B was repeated wherein the amount of tetrabutylphosphonium bromide catalyst was decreased to 0.0935 gram (0.000275 mole) and the amount of vinyl and isocyanate terminated urethane oligomer was decreased to 67.65 grams (0.0275 mole). The modified epoxy resin was recovered as a light yellow colored, transparent solution with an EEW of 193.26. A theoretical EEW of 194.75 was calculated for the modified epoxy resin wherein all isocyanate groups of the vinyl and isocyanate terminated urethane oligomer are converted to oxazolidinone groups. The modified diglycidyl ether of bisphenol A containing oxazolidinone linkages and vinyl unsaturation (1067.1 grams) was heated to 110° C. and maintained with stirring under a nitrogen atmosphere then addition of a 2-ethylhexyl acrylate (68.2 grams) and azobisisobutyronitrile (0.682 gram) solution was completed over a 105 minute (6300 s) period. The reaction was continued at the 110° C. reaction temperature for an additional 60 minutes (3600 s) then the polymer modified epoxy resin containing oxazolidinone linkages was recovered as an opaque, light yellow colored liquid with an EEW of 205.94.

B. Preparation of Cured Copolymer of Modified Diglycidyl Ether of Bisphenol A Containing Oxazolidinone Llnkages and Vinyl Unsaturation with 2-Ethylhexyl Acrylate A portion (220 grams) of the copolymer of modified diglycidyl ether of bisphenol A containing oxazolidinone linkages and vinyl unsaturation with 2-ethylhexyl acrylate from A above was heated to 100° C. then combined thoroughly with 4,4'-diaminodiphenyl methane (52.88 grams) which was also heated to 100° C. The resulting mixture was used to prepare an unfilled ⅛ inch (0.3175 cm) casting which was cured for 2 hours (7200 s) at 125° C. then post cured for 2 hours (7200 s) at 177° C. The resulting opaque, unfilled casting was used for mechanical property evaluations using the method of Example 3. The results are given in Table II.

TABLE II

| Barcol Hardness | 20 |
| --- | --- |
| Tensile Strength, |  |
| psi | 9708 |
| kPa | 66,935 |
| Elongation, % | 7.22 |
| Flexural Strength, |  |

TABLE II-continued

| | |
|---|---|
| psi | 16,214 |
| kPa | 111,792 |
| Flexural Modulus, | |
| psi | 422,978 |
| kPa | 2,916,349 |
| Heat Distortion Temperature, | |
| °F./°C. | 284/140 |

I claim:

1. A vinyl ester composition comprising
   (I) the reaction product of
   (A) at least one urethane oligomer modified epoxy resin composition which comprises the reaction product of
   (1) at least one epoxy resin with
   (2) at least one urethane oligomer containing at least one oxyalkylene group or thioalkylene group and both polymerizable ethylenically unsaturated and isocyanate or isothiocyanate groups in the presence of
   (3) a catalyst for oxazolidinone or thiazolidinone formation; and wherein components (I-A-1) and (I-A-2) are present in quantities such that from about 0.001 to about 25, percent of the epoxide groups of component (I-A-1) are converted to oxazolidinone (thiazolidinone) groups and component (I-A-3) is employed in an amount sufficient to cause reaction of component (I-A-1) with component (I-A-2) to form oxazolidinone (thiazolidinone) groups, preferably from about 0.01 to about 3, parts by weight based on the combined weight of components (I-A-1), (I-A-2) and (I-A-3);
   (B) at least one member selected from
   (1) at least one polymerizable ethylenically unsaturated monocarboxylic acid,
   (2) at least one polymerizable ethylenically unsaturated half-ester of a dicarboxylic acid, or
   (3) mixtures of (I-B-1) and (I-B-2).

2. A vinyl ester composition of claim 1 components (I-A-1) and (I-A-2) are present in quantities such that from about 0.5 to about 15 percent of the epoxide groups of component (I-A-1) are converted to oxazolidinone (thiazolidinone) groups and component (I-A-3) is employed in an amount of from about 0.1 to about 1.5 parts of component (I-A-3) by weight based on the combined weight of components (I-A-1), (I-A-2) and (I-A-3).

3. A vinyl ester composition of claim 2
   (i) component (I-A-1) is an epoxy resin represented by formulas (I), (II), (III) or (IV) in the specification wherein each A is independently a divalent hydrocarbon group having from 1 to about 12 carbon atoms,

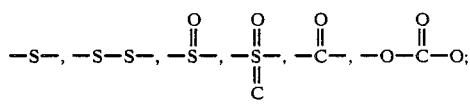

each A' is independently a divalent hydrocarbon group having from 1 to about 3 carbon atoms or a

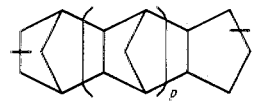

group; each R is independently hydrogen or a hydrocarbyl group having from 1 to about 3 carbon atoms; each R' is independently hydrogen, a hydrocarbyl or hydrocarbyloxy group having from 1 to about 18 carbon atoms or a halogen atom; m has a value of from about 0.001 to about 6; n has a value of zero or 1; n' has a value from zero to about 40; and p has a value from zero to about 10;
   (ii) component (I-A-2) is the reaction product of (a) a material containing at least two active hydrogen atoms selected from —OH, —SH, —NH or —NH$_2$ or a combination thereof and at least one oxyalkylene group per molecule, (b) an organic material containing at least two isocyanate or isothiocyanate groups or combination thereof per molecule and (c) at least one material having a group reactive with an isocyanate or isothiocyanate group and a polymerizable ethylenically unsaturated group;
   (iii) component (I-A-3) is quaternary ammonium halide or a phosphonium compound or a combination thereof; and
   (iv) component (I-B) is component (I-B-1).

4. A vinyl ester composition of claim 3 wherein component (I-A-1) is an epoxy resin represented by formula (II) wherein n has a value of 1; n' has a value from 0.1 to about 5.

5. A vinyl ester composition of claim 4 wherein
   (i) component (I-A-1) is a diglycidyl ether of bisphenol A;
   (ii) component (I-A-2-a) is a polyoxyalkylene glycol;
   (iii) component (I-A-2-b) is a diisocyanate (diisothiocyanate);
   (iv) component (I-A-2-c) is a hydroxyalkyl acrylate or methacrylate;
   (v) component (I-A-3) is a tetrabutylphosphonium halide; and
   (vi) component (I-B) is acrylic acid or methacrylic acid.

6. A vinyl ester resin composition resulting from blending al least one vinyl ester of claim 1 with at least one polymerizable ethylenically unsaturated monomer wherein said poymerizable ethylenically unsaturated monomer is present in an amount of from about 1 to about 99 percent by weight of the combined weight of the vinyl ester and the polymerizable ethylenically unsaturated monomer components.

7. A vinyl ester resin composition resulting from blending at least one vinyl ester of claim 1 with at least one polymerizable ethyenically unsaturated monomer wherein said polymerizable ethylenically unsaturated monomer is present in an amount of from about 20 to about 80 percent by weight of the combined weight of the vinyl ester and the polymerizable ethylenically unsaturated monomer components.

8. A vinyl ester resin composition resulting from blending at least one vinyl ester of claim 1 with at least one polymerizable ethylenically unsaturated monomer wherein said polymerizable ethylenically unsaturated monomer is present in an amount of from about 30 to about 70 percent by weight of the combined weight of the vinyl ester and the polymerizable ethylenically unsaturated monomer components.

9. A product resulting from curing a composition of claim 1 in the presence of an effective curing agent therefor and optionally in the presence of a suitable accelerator therefor.

10. A product resulting from curing a composition of claim 2 in the presence of an effective curing agent therefor and optionally in the presence of a suitable accelerator therefor.

11. A product resulting from curing a composition of claim 3 in the presence of an effective curing agent therefor and optionally in the presence of a suitable accelerator therefor.

12. A product resulting from curing a composition of claim 4 in the presence of an effective curing agent therefor and optionally in the presence of a suitable accelerator therefor.

13. A product resulting from curing a composition of claim 5 in the presence of an effective curing agent therefor and optionally in the presence of a suitable accelerator therefor.

14. A product resulting from curing a composition of claim 6 in the presence of an effective curing agent therefor and optionally in the presence of a suitable accelerator therefor.

15. A product resulting from curing a composition of claim 7 in the presence of an effective curing agent therefor and optionally in the presence of a suitable accelerator therefor.

16. A product resulting from curing a composition of claim 8 in the presence of an effective curing agent therefor and optionally in the presence of a suitable accelerator therefor.

17. A polymer modified vinyl ester composition comprising the reaction product of
(A) at least one polymer modified epoxy resin resulting from polymerizing at least one polymerizable ethylenically unsaturated compound or mixture of such compounds with at least one urethane oligomer modified epoxy resin which comprises the reaction product of
  (1) at least one epoxy resin with
  (2) at least one urethane oligomer containing at least one oxyalkylene group or thioalkylene group and both polymerizable ethylenically unsaturated and isocyanate or isothiocyanate groups in the presence of
  (3) a catalyst for oxazolidinone or thiazolidinone formation; and wherein components (1) and (2) are present in quantities such that from about 0.001 to about 25 percent of the epoxide groups of components (1) are converted to oxazolidinone (thiazolidinone) groups and component (3) is employed in an amount sufficient to cause reaction of component (1) with component (2) to form oxazolidinone (thiazolidinone) groups, preferably from about 0.01 to about 3 parts of component (3) by weight based on the combined weight of components (1), (2) and (3);
(B) at least one member selected from
  (1) at least one polymerzable ethylenically unsaturated monocarboxylic acid,
  (2) at least one polymerizable ethylenically unsaturated half-ester of a dicarboxylic acid, or
  (3) a combination of (B-1) and (B-2).

18. A vinyl ester resin composition resulting from at least one polymer modified vinyl ester of claim 17 with at least one polymerizable ethylenically unsaturated monomer wherein said polymerizable ethylenically unsaturated monomer is present in an amount of from about 1 to about 99 percent by weight of the combined weight of the polymer modified vinyl ester and the polymerizable ethylenically unsaturated monomer components.

19. A product resulting from curing a composition of claim 17 in the presence of an effective curing agent therefor and optionally in the presence of a suitable accelerator therefor.

20. A product resulting from curing a composition of claim 18 the presence of an effective curing agent therefor and optionally in the presence of a suitable accelerator therefor.

* * * * *

UNITED STATES PATENT AND TRADEMARK OFFICE
CERTIFICATE OF CORRECTION

PATENT NO. : 4,786,693
DATED : November 22, 1988
INVENTOR(S) : Robert E. Hefner, Jr.

It is certified that error appears in the above-identified patent and that said Letters Patent is hereby corrected as shown below:

Col. 2, line 4; change "wilh" to --with--.

Col. 2, line 56; change "east" to --least--.

Col. 4, line 60; change "(isothiacyanate)" to --(isothiocyanate)--.

Col. 4, line 66; change "east" to --least--.

Col. 4, line 68; change "remaln" to --remain--.

Col. 5, line 2; change "aiphatic" to --aliphatic--.

Col. 5, line 7; delete the letter "c" from "hexamethylenediisoc-".

Col. 6, line 30; change "possiblity" to --possibility--.

Col. 6, line 34; change "an" to --and--.

Col. 8, line 3; change "ione" to --inone--.

Col. 8, line 3; change "(thiazolidone)" to --(thiazolidinone)--.

Col. 8, line 51; change "urethan" to --urethane--.

Col. 11, line 20; insert a closing parenthesis --)-- after "gram".

Col. 11, line 46; insert a beginning parenthesis --(-- before "0.5".

Col. 12, line 25; insert a closing parenthesis --)-- after "gram".

Col. 12, line 25; change "terLiary" to --tertiary--.

UNITED STATES PATENT AND TRADEMARK OFFICE
CERTIFICATE OF CORRECTION

PATENT NO. : 4,786,693
DATED : November 22, 1988
INVENTOR(S) : Robert E. Hefner, Jr.

It is certified that error appears in the above-identified patent and that said Letters Patent is hereby corrected as shown below:

Col. 12, line 33; change "demonstrate" to --demonstrated--.

Col. 12, line 43; change "anaysis" to --analysis--.

Col. 12, line 43; change "fim" to --film--.

Col. 12, line 44; change "essentialy" to --essentially--.

Col. 13, line 28; insert a closing parenthesis --)-- after "grams".

Col. 13, line 40; insert a beginning parenthesis --(-- before "93.38".

Col. 13, line 57; insert a closing parenthesis --)-- after "s".

Col. 15, line 44, Claim 2; insert --wherein-- before "components".

Col. 15, line 53, Claim 3; insert --wherein-- after "Claim 2".

Col. 16, line 48, Claim 6; change "al" to --at--.

Col. 16, line 50, Claim 6; change "poymerizable" to --polymerizable--.

Col. 16, line 57, Claim 7; change "ethyenically" to --ethylenically--.

Col. 18, line 11, Claim 17; change "components" to --component--.

UNITED STATES PATENT AND TRADEMARK OFFICE
CERTIFICATE OF CORRECTION

PATENT NO. : 4,786,693

DATED : November 22, 1988

INVENTOR(S) : Robert E. Hefner, Jr.

It is certified that error appears in the above-identified patent and that said Letters Patent is hereby corrected as shown below:

Col. 18, line 20, Claim 17; change "polymerzable" to --polymerizable--.

Col. 18, line 25, Claim 18; insert --blending-- after "from".

Col. 18, line 39, Claim 20; insert --in-- after "Claim 18".

Signed and Sealed this

Twenty-first Day of November, 1989

Attest:

JEFFREY M. SAMUELS

*Attesting Officer*  *Acting Commissioner of Patents and Trademarks*